June 7, 1966  J. J. DELANY ETAL  3,254,664
DIAPHRAGM VALVE AND BYPASS ASSEMBLY
Filed Jan. 28, 1963
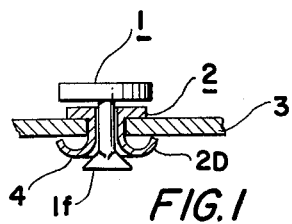
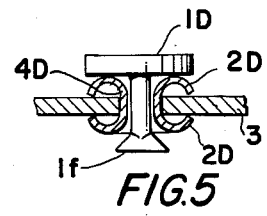
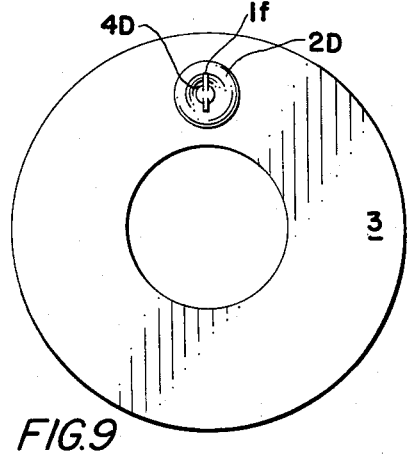
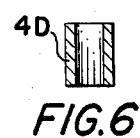
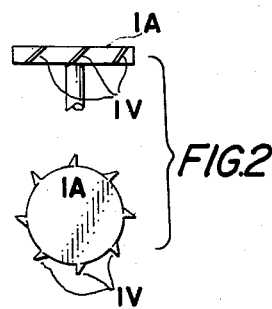
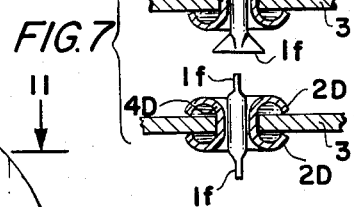
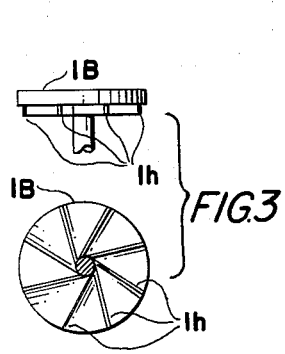
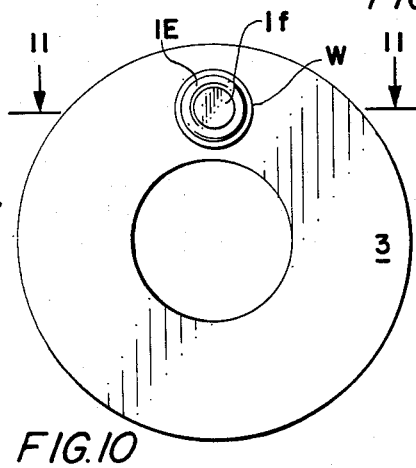
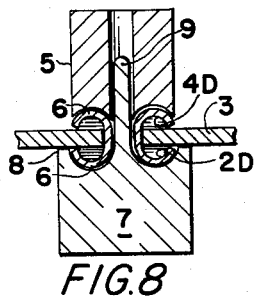
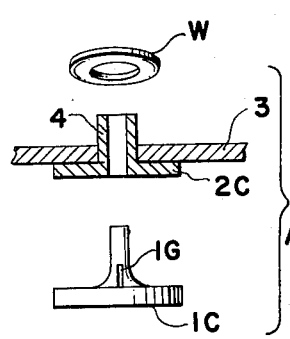
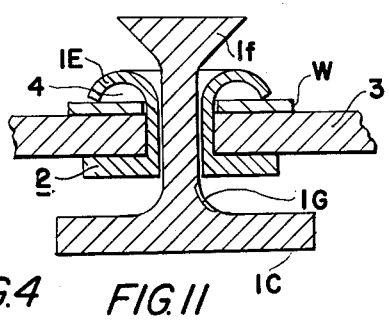
INVENTORS
J.J. DELANY
E.C. BAISEL
J.D. LANGDON

United States Patent Office 3,254,664
Patented June 7, 1966

3,254,664
DIAPHRAGM VALVE AND BYPASS ASSEMBLY
John J. Delany and Edwin C. Baisel, Brooklyn, and Jesse
D. Langdon, East Rockaway, N.Y. (all of 828 Kent
Ave., Brooklyn, N.Y.)
Filed Jan. 28, 1963, Ser. No. 254,083
5 Claims. (Cl. 137—244)

This invention relates to diaphragm valve members for use with pressure operated valves, particularly flushometers and the like, where a metered flow of water is required to flush water closets and other plumbing fixtures of similar nature. The primary object of the invention is to provide an article of manufacture in the form of a diaphragm and bypass valve unit of superior merit capable of being economically, efficiently and accurately manufactured and aims to teach a new and better manner and process of making and using the unit.

Another object of the invention is to utilize material for the diaphragm of minimum stretch capability and provide a bypass passage therethru, surrounded by material capable of being swedged to form and holding its shape after being formed.

A still further object is to provide newly discovered ways to use a swedging tool or die, including male and female members capable of being converged in a manner to form, shape and accurately size a bypass passage thru a diaphragm valve member of the nature described.

Other and further objects and purposes will appear in the context of the specification, as illustrated by the drawing; showing the best way known to the inventor for adapting various forms and species of the invention to use.

The forms of reduction to practice shown by the drawing are used for purpose of illustration only and may be changed within scope of the claims.

Identical numerals are used thruout all figures of the drawing to illustrate identical parts. Capital letters being added to numerals to indicate modified forms of same elements.

Of the drawing:
FIG. 1 is a vertical median sectional elevation, and shows a disc headed bypass pin 1 shown in relief slidably inserted from flange end 2 of sleeve 4 extended thru a diaphragm 3; the flared distal terminus 1f of pin 1 limiting movement and holding same in operative relationship.

FIG. 2 is a detail showing in vertical elevation a modified form of bypass pin 1A, having a disc-like head provided with veins 1V disposed obliquely about the periphery of pin 1A, also showing a top view of pin 1A.

FIG. 3 shows a vertical elevation of, and view of the under side of another type of disc-headed bypass pin 1B, provided with helically disposed propellor blades 1h formed on its under side.

FIG. 4 shows a partially exploded detail of an alternative type of bypass assembly element, including washer W shown in relief, a vertical median sectional elevation of bypass sleeve 4 provided with flange 2C and inserted upwardly thru diaphragm 3 shown in section, also disc-headed bypass pin 1C, filleted between the stem and head, the fillet being provided with groove 1G disposed transversely of the fillet.

FIG. 5 is a vertical elevation of disc-headed pin 1D slidably inserted thru sleeve 4D disposed thru diaphragm 3 shown in sectional elevation, being an alternative type of assembly, wherein both ends of sleeve 4D are swedged and flared and curled as at 2D.

FIG. 6 is a vertical sectional elevation of sleeve 4D before being swedged and flared as at 2D.

FIG. 7 shows two opposite vertical median sectional views taken thru diaphragm 3 and sleeve 4D with bypass pin shown in relief slidably inserted thru sleeve 4D and provided with flared ends 1f—1f, sleeve 4D being provided with curled flanges 2D—2D, having peripheral edges 2S impinging diaphragm 3 as shown by FIG. 5.

FIG. 8 is a vertical median sectional elevation of a swedging tool or die taken thru a female die portion 5 having one end provided with a rounded annular groove 6 facing another annular matching groove 6 recessed in the proximate end of male punch 7 provided with mandril 9 inserted into a hole provided thru female die 5; shoulder 8 surrounds groove 6 of male die 7 supporting curled flanges 2D between annular grooves 6—6.

FIG. 9 is a view of under side of diaphragm valve and bypass assembly of either FIG. 1 or 5 and may be considered a view from either side of diaphragm 3 when assembled with species of bypass means shown by FIG. 7.

FIG. 10 is an upper or pressure chamber side view of a diaphragm valve unit when assembled with elements depicted by FIGS. 4 and 11.

FIG. 11 is enlarged detail depicting all elements shown by FIG. 4 as a unit, being a vertical median sectional elevation intersecting a portion of diaphragm 3, stem of disc-headed pin 1C having a conically flared distal end 1f, flange 2 of sleeve 4, the end 1E of sleeve 4 forming a seat conforming with conical flange end 1f and being curled to impinge washer W against upper side of diaphragm 3, holding recited elements in assembled relationship.

The species illustrated by FIG. 1 shows a pin 1 formed with a substantially disc-like flat head having its under side normally resting against an upper flanged portion 2 of hollow sleeve 4 premolded to shape and inserted from the top to the under side of and thru diaphragm 3. Pin 1 is slidably extended downwardly thru hollow of sleeve 4 surrounding an annular bypass passage formed by a clearance space around the shank of pin 1. A swedged lower end 2D is provided for sleeve 4, its lower end being expanded radially outward, curled upwardly and shaped with a peripheral edge as at 2S of flange 2D as shown by FIG. 7, but impinging the lower face of diaphragm 3 secured concomitant sleeve 4, thereby squeezing the diaphragm firmly between flange 2 and the periphery of lower swedged and curled portion of 2D terminating the lower flared end of sleeve 4. The annular clearance space provided between the inside wall of sleeve 4 and pin 1, forms passage means for liquid under pressure bypassing diaphragm 3 from one side to the other, namely from the under or pressure fluid supply side to the pressure chamber or upper side of diaphragm 3. Pin 1 is provided with a fan-like flange 1f as of FIG. 1, being flattened and flared in the manner shown, permitting passage of pressure fluid each side of the flared end of pin 1 and thru the hollow of sleeve 4, around pin 1 and into any pressure chamber located above diaphragm 3. The thickness of the fan-like flare being less than the diameter of the hollow of sleeve 4 is such as to provide openings communicating with the annular passage formed by a clearance space above mentioned for bypassing pressure fluid thru diaphragm 3. The amount of pressure fluid flowing thru the hollow of sleeve 4 is determined by the thickness of fan-like flare 1f. The greater the thickness of the flare with respect to the diameter of the hollow of the sleeve, the more restricted will be the passages each side of the flare or vice versa.

When a pressure condition exists against the under or supply side of diaphragm 3 greater than that against the upper or pressure chamber side of diaphragm 3, pressure fluid bypasses the diaphragm via the annular bypass passage thru hollow of sleeve 4 surrounding pin 1 or its equivalent, as of various species illustrated and described herein. Pressure fluid flowing upwardly thru the hollow of sleeve 4, impinges the under side of and raises the disc-like head of pin 1 permitting fluid flow from the under to the upper side of diaphragm 3. When negative pressure exists beneath diaphragm 3, pressure against the top of disc-like head causes same to assume normal position of rest closing the hollow of sleeve 4 against downward passage of fluid.

The species of bypass pin 1A illustrated by FIG. 2 is provided with peripheral impellor blades obliquely disposed with relation to the plane of the disc-like head of pin 1A and may be substituted for any other species type of pin shown herein whereby the pin is rotated inside the hollow of sleeve 4, effective to aid in keeping the annular bypass passage thru the hollow of sleeve 4 clear of corrosive matter or sediment.

FIG. 3 shows a modified disc-like head for pin 1B, the under side of the head provided with helical ridges 1h, extended from the outer side of stem of pin 1B and laterally of stem axis, forming impellor blades for rotating pin 1B when substituted for pin 1 of FIG. 1, at such times as pressure fluid is flowing thru the annular bypass passage around stem of pin 1B, thereby rotating pin 1B effective to aid in cleaning the annular passage thru hollow of sleeve 4 or 4D.

FIG. 4 shows elements comprising a disc-headed pin 1C filleted around the shank of the pin 1C at the confluence of its head and shank. A groove 1G extended thru and transversely of the fillet and forming auxiliary bypass passage means for bypassing an adjacent portion of the edge of the hollow of sleeve 4 that is proximate the fillet when resting against the proximate edge of the hollow at such times as fluid pressure against the head of pin 1C, urges same toward and against the hollow sleeve 4, whereby pressure fluid is permitted to bypass the proximate edge of the hollow, and flow thru the annular bypass passage formed by a clearance space provided between the inner wall of hollow sleeve 4 and shank of pin 1C. See FIG. 11.

FIG. 5 illustrates another species of the invention, wherein the flared end 1f of pin 1D is flattened as illustrated by FIGS. 1, 5, 7 and 9. Sleeve 4D being provided with a flared and curled lower end as at 2D, same being curled to form an annular periphery edge as at 2S, FIG. 7. The curled lower and upper flanges of sleeve 4D impinging opposite sides of diaphragm 3 holding sleeve 4D firmly in a unit with the diaphragm 3 and effectively sealing against leakage of pressure fluid around the outside of sleeve 4D. The operation of the species illustrated by FIG. 5 is substantially the same as that of FIG. 4.

FIG. 6 illustrates the form of sleeve 4D before being swedged and shaped with oppositely curled flanges 2D—2D as shown by FIGS. 5, 7 and 8. FIG. 7 illustrates another species of pin terminating in opposite flared ends 1f—1f to retain and limit movement of the pin loosely slidable thru the bypass passage encompassed by sleeve 4D. If desired the upper end of the pin illustrated by FIG. 7 may be conically flared as at 1f shown by FIG. 11, thereby forming a check valve capable of being urged to seat against and close the inner upper pressure chamber end 1E of the bypass passage thru sleeve 4 as shown by FIG. 11 or 4D of FIG. 7 at such times as negative pressure exists on the lower pressure fluid supply side of diaphragm 3.

FIG. 8 illustrates a preferred means for activating the manner and process of making and using the invention, namely, a swedging device in form of a male punch 7 provided with mandril 9 and matching female die 5 is provided with convergent opposed annularly grooved ends 6—6, the punch being formed with an annular supporting shoulder 8 surrounding its respective groove 6. The manner of making the device in the form shown by FIG. 1 comprising the invention consists of utilizing a flanged sleeve 4 either being performed or molded with a flange 2 or 2C as illustrated by FIGS. 1 and 4 respectively. Diaphragm 3 is first perforated, the small end of flanged sleeve 2–4 is then inserted thru diaphragm 3, with top of head 2 facing upwardly, sleeve 4 carried by diaphragm 3 is slipped over mandril 9 of punch 7, the punch and die are then urged together in the position shown by FIG. 8, diaphragm 3 resting upon supporting shoulder 8. The outer rim of annular groove 6 recessed into die 5 serves to urge the outer rim of flange portion 2 tightly against diaphragm 3 being preferred practice when sleeve 4 is premolded to shape at the flanged end 2 or 2C of FIGS. 1 and 4 respectively. However, groove 6 of die 5 may be dispensed with, if desired when a flanged disc-like head 2 is provided for sleeve 4. Final step of the process described supra is to insert pin 1 thru bypass passage means formed by sleeve 2 and flaring the distal end 1f of pin 1 in a manner to permit longitudinal movement of pin 1. Diameter of pin 1 with relation to size of hollow passage thru sleeve 4 may be varied to regulate rate of flow thru bypass passage encompassed by sleeve 4 and the thickness and shape of flanged end 1f may be changed to meet exigencies of timing flow of pressure fluid thru annular bypass means provided inside the hollow sleeve 4 or any other species illustrated.

When utilizing the form of sleeve 4D shown by FIG. 6, the manner and process of making and using the device as of FIGS. 5 and 7 is substantially the same as that described above for making the device illustrated by FIG. 1.

The manner and process of making and using the embodiment of the invention illustrated by FIG. 11, in view of FIG. 4, consists of using a washer W beneath rim of flared end 1E of sleeve 4 forming a seat for coniform flared end 1f of pin 1C. In this instance the position of pin 1C is the reverse of that of pin 1–1f of FIG. 1. This change in position requires that bypass means be provided between the head and stem of pin 1C, in this instance provided by groove means 1G thru a fillet surrounding the stem at the confluence of head and stem. The slot or groove 1G forming an auxiliary bypass passage communicating between the passage thru hollow sleeve 4 and across the edge of the opening thru flanged end 2C as of FIG. 4 and FIG. 11 to provide means for bypassing pressure fluid thru diaphragm 3 at such times as the head of pin 1C is urged toward said sleeve 4 due to effect of pressure fluid. In the instance of FIG. 11 as shown by FIG. 11, when negative pressure exists on the under or supply side of diaphragm 3 the coniform flared end 1f is urged to seat inside flared end 1E of the passage thru sleeve 4 closing same against and equalizing pressure on opposite sides of diaphragm 3, a positive condition of pressure existing on the upper or pressure chamber side of diaphragm 3.

The means, manner and process of making and using the invention generally applied to all species illustrated is as follows: (1) Placing or securing male die portion 7 in upright position with shoulder 8 and mandril 9 pointing upwardly. (2) Insert hollow sleeve 4 or 4D thru a suitable perforation in flexible diaphragm 3: Where a molded sleeve 4 is used the male die 7 need not be provided with annular curling groove 6: The flat flanged portion 2–2C being placed against shoulder 8 of male die 7: Female die 5 is then slipped over mandril 9 with annular groove 6 facing supporting shoulder 8 and forced against the small end of hollow sleeve 4: Where sleeve 4D is used, matching grooves 6—6 of female die 5 and male die 7 curl the opposite ends in a manner to form a peripheral edge as at 2S, FIG. 7, at each end of hollow sleeve 4D. (3) Any form of pins 1, 1A, 1B or 1C may be suitably flanged and formed to coincide with description supra. It is obvious if the male and female die portions are urged together with sufficient pressure to force the material of sleeve 4 or 4D firmly around mandril 9 and swedge the edges formed by periphery as at 2S, FIG. 7, of flanges 2D—2D, thereby accurately sizing the hollow of sleeve 4 or 4D according to the diameter of mandril 9.

The mandrel should be suitably tapered to facilitate withdrawal from the passage thru sleeve 4 or 4D.

It is preferable to have as small and narrow an area of the sleeve passage as possible conforming to actual size of the mandril in order to accurately size and form the hollow of sleeve 4 or 4D to control size of bypass passage surrounding any form of pin shown. That portion of annular bypass passage immediately around pins should be tapered to the narrowest possible area, in order to reduce possibility of a bypass pin sticking in the bypass passage due to deposits of foreign material or corrosion.

Suitable plastic materials not subject to corrosion such as acetal and vinyl products are recommended. Thermoplastics may be used, by heating the dies. Very light guage Monel metal sleeves can be used with pins made of the same material.

The described manner and process of making the device actually molds precisely sized bypass means thru diaphragm 3, and integral with diaphragm 3 using the instant process; therefore it is obvious that if sleeve and diaphragm were made of non-stretchable but flexible plastic, the described form of dies could be used to form, mold, shape and perforate a bypass passage in a unit with material of the diaphragm.

Therefore, this invention involves the best manner and process known to the co-inventors hereof for making and using the devices defined as this invention; comprising bypass passage means swedged and molded as a unit with a diaphragm made of substantially non-stretchable but flexible material capable of being swedged or molded to size and shaped by using the means, manner and process set forth supra.

Having described our invention as an article of manufacture together with the manner and process of making and using same, the following claims are made:

1. Diaphragm means for use in a flush valve having an inlet and outlet with a passage therebetween closed by said diaphragm means which is biased to open position by pressure in the inlet acting on one side thereof and held in closed position by pressure in a chamber applied to its opposite side, comprising a member of flexible material, said diaphragm means being provided with sleeve means extended therethrough forming passage means communicating with opposite sides of said diaphragm means, opposite ends of said sleeve means extending through said diaphragm means and being provided with flange means forming an eyelet, pin means of less diameter than said passage means extending through said passage means, said pin means provided with enlarged opposite ends spaced away from one another a distance greater than the length of said sleeve means to permit said pin means limited reciprocation through said passage means at least one end of said pin means being flat laterally and of less thickness than the diameter of said passage means to form at least one of said enlarged ends to permit free passage of fluid in line with said passage means.

2. An article of manufacture defined by claim 1, wherein at least one end of the eyelet is flared, curled and flanged radially outward by the bypass passage, the periphery of the flanged end impinging the diaphragm means and an apex formed by the outer face curled end, providing narrow annular seat means for the proximate surface of enlarged head means provided for at least one end of the bypass pin means and forming check valve means for closing said bypass passage means.

3. A device as defined by claim 2 wherein the enlarged head means is provided with helical vanes radiating from the bypass pin means beneath said disk means for imparting rotation to the bypass pin means induced by fluid pressure flowing from the bypass passage means against the vanes.

4. A device as defined by claim 2 wherein the enlarged head forming check valve means is disc-shaped in form and is provided with helical vanes projecting from the periphery of the disc for imparting rotation to the bypass pin means induced by fluid pressure flowing upwardly past said periphery.

5. A diaphragm valve and bypass assembly comprising the combination of diaphragm means provided with an axially disposed opening for insertion of seat means for a fluid pressure controlled valve, sleeve means forming eyelet means providing bypass passage means disposed thru said diaphragm means between the axial opening and the periphery of said diaphragm means, opposite ends of said eyelet means being flanged and flared radially outward of the bypass passage means, the flange of at least one end of said eyelet means being shaped with a convex surface projecting away from said diaphragm means, same being impinged between the periphery of the convex flange and the oppositely disposed flange for pressure tight assembly, the apex of the projecting convexity forming narrow annular seat means for the head of means longer than said bypass passage means, bypass pin reciprocally disposed thru said bypass passage means, that end of the pin that is opposite said head being provided with an enlargement spaced away from the proximate end of said eyelet to form retaining means to hold said pin in operative position within said bypass passage means, clearance being provided around said pin and said retaining means to permit flow of fluid thru said bypass passage means.

References Cited by the Examiner

UNITED STATES PATENTS

| | | | |
|---|---|---|---|
| 873,627 | 12/1907 | Staunton | 137—533.21 X |
| 978,729 | 12/1910 | Garber | 137—533.23 X |
| 1,317,441 | 9/1919 | Graf | 137—332 |
| 1,365,856 | 1/1921 | Sandlin | 137—332 |
| 1,540,031 | 6/1925 | Nette | 137—332 |
| 2,100,438 | 11/1937 | Forrester | 29—157.1 |
| 2,211,237 | 8/1940 | Langdon | 251—43 X |
| 2,677,876 | 5/1954 | Juhnke et al. | 29—157.1 |
| 3,055,536 | 9/1962 | Dieny | 220—44 |

FOREIGN PATENTS

| | | |
|---|---|---|
| 1,086,721 | 8/1954 | France. |

ISADOR WEIL, *Primary Examiner.*

D. ROWE, C. GORDON, *Examiners.*